US011936689B2

(12) United States Patent
Risso et al.

(10) Patent No.: US 11,936,689 B2
(45) Date of Patent: Mar. 19, 2024

(54) TRANSMISSION OF DATA OR MESSAGES ON BOARD A VEHICLE USING A SOME/IP COMMUNICATION PROTOCOL

(71) Applicants: ITALDESIGN-GIUGIARO S.P.A., Turin (IT); POLITECNICO DI TORINO, Turin (IT)

(72) Inventors: Fulvio Risso, Manta (IT); Fulvio Valenza, Turin (IT); Riccardo Sisto, Turin (IT); Marco Iorio, Villafranca Piemonte (IT); Massimo Reineri, Turin (IT); Alberto Buttiglieri, Mappano (IT)

(73) Assignees: POLITECNICO DI TORINO, Turin (IT); ITALDESIGN-GIUGIARO S.P.A., Turin (IT)

( * ) Notice: Subject to any disclaimer, the term of this patent is extended or adjusted under 35 U.S.C. 154(b) by 337 days.

(21) Appl. No.: 17/605,188

(22) PCT Filed: Apr. 23, 2020

(86) PCT No.: PCT/IB2020/053851
§ 371 (c)(1),
(2) Date: Oct. 20, 2021

(87) PCT Pub. No.: WO2020/217202
PCT Pub. Date: Oct. 29, 2020

(65) Prior Publication Data
US 2022/0201039 A1 Jun. 23, 2022

(30) Foreign Application Priority Data
Apr. 23, 2019 (IT) .................... 102019000006242

(51) Int. Cl.
*H04L 29/06* (2006.01)
*H04L 9/32* (2006.01)
*H04L 9/40* (2022.01)

(52) U.S. Cl.
CPC .......... *H04L 63/164* (2013.01); *H04L 9/3242* (2013.01); *H04L 9/3247* (2013.01);
(Continued)

(58) Field of Classification Search
CPC ... H04L 63/164; H04L 9/3242; H04L 9/3247; H04L 9/3268; H04L 63/0869;
(Continued)

(56) References Cited

U.S. PATENT DOCUMENTS

| 2013/0333038 A1* | 12/2013 | Chien | H04L 63/1408 726/23 |
| 2018/0189103 A1* | 7/2018 | Teshler | G06F 21/53 |
| 2019/0079869 A1* | 3/2019 | Baldi | H04L 67/5682 |

OTHER PUBLICATIONS

International Search Report, issued in PCT/IB2020/053851, dated Aug. 25, 2020, Rijswijk, NL.
(Continued)

*Primary Examiner* — Harunur Rashid
(74) *Attorney, Agent, or Firm* — Valauskas Corder LLC (57) ABSTRACT

A method for transmitting messages on a communications network on board a vehicle between a requesting entity requesting a service instance and an offering entity offering a service instance using a Service Oriented MiddlewarE over Internet Protocol (SOME/IP) communication protocol is provided. The method includes a preliminary mutual authentication step between the requesting entity and the offering entity in view of a communication associated with the service instance, including verifying existence and mutual validity of a pre-assigned certificate of the requesting entity and the offering entity, authorizing access to the service instance, verifying that security level of the service offered by the offering entity is not lower than a minimum security level pre-assigned to the service at the requesting
(Continued)

entity and at the offering entity and transmitting at least one communication message associated with the service instance from the offering entity to the requesting entity and vice versa based on successful security level verification and successful pre-assigned certificate verification.

10 Claims, 5 Drawing Sheets

(52) U.S. Cl.
CPC ........ *H04L 9/3268* (2013.01); *H04L 63/0869* (2013.01); *H04L 2209/84* (2013.01)

(58) Field of Classification Search
CPC ............. H04L 2209/84; H04L 63/0428; H04L 63/0823; H04L 63/12; H04L 63/105; H04L 67/12

See application file for complete search history.

(56) References Cited

OTHER PUBLICATIONS

AUTOSAR, Specification of Manifest AUTOSAR AP Release 17-10, Oct. 17, 2017, URL: https://www.autosar.org/fileadmin/user_upload/standards/adaptive/17-10/AUTOSAR_TPS_ManifestSpecification.pdf, retrieved from the Internet on Dec. 18, 2019.

Jochen Kreissl, Absicherung der SOME/IP Kommunikation bei Adaptive AUTOSAR, Nov. 15, 2017, URL: https://elib.uni-stuttgart.de/bitstream/11682/9482/1/ausarbeitung.pdf, retrieved from the Internet on Dec. 18, 2019.

AUTOSAR, Specification of Communication Management AUTOSAR AP Release 17-10, Oct. 17, 2017, URL: https://www.autosar.org/fileadmin/user_upload/standards/adaptive/17-10/AUTOSAR_SWS_CommunicationManagement.pdf, retrieved from the Internet on Dec. 18, 2019.

Rescorla Mozilla E., The Transport Layer Security (TLS) Protocol Version 1.3; rfc8446.txt, The Transport Layer Security (TLS) Protocol Version 1.3; RFC8446.txt, Internet Engineering Task Force, IETF; Standard, Aug. 11, 2018, pp. 1-160, Internet Society Geneva, CH.

\* cited by examiner

TRANSMISSION OF DATA OR MESSAGES ON BOARD A VEHICLE USING A SOME/IP COMMUNICATION PROTOCOL

CROSS-REFERENCE TO RELATED APPLICATIONS

This application is a U.S. National Phase filing of PCT International Patent Application No. PCT/IB2020/053851, having an international filing date of Apr. 23, 2020, which claims priority to Italian Patent Application No. 102019000006242, filed Apr. 23, 2019 each of which is hereby incorporated by reference in its entirety.

FIELD OF THE INVENTION

The present invention generally relates to the transmission of data or messages on an on-board network of a vehicle, and more particularly the transmission of data or messages on an on-board network of a vehicle by means of the SOME/IP communication protocol.

Specifically, the present invention relates to a method for transmitting data or messages on an on-board network of a vehicle between at least one entity requesting a service instance and an entity offering a service instance by a SOME/IP communication protocol.

BACKGROUND OF THE INVENTION

SOME/IP, Scalable service-Oriented MiddlewarE over IP, is a communication protocol developed for the automotive sector to transmit messages and communications over an Ethernet network operating on board a vehicle, between devices of different sizes, functions and operating systems, for example, from cameras to telematic entertainment and information units. The SOME/IP protocol provides service-oriented communication, and is based on a list of services that are declared a priori by each application. For each application there is a so-called "manifest" in which all the services offered and the services to which the application requires access are stated. A service, or the data it provides, may be accessed by a device connected to the vehicle's on-board communications network following events, in which an offering device transmits messages cyclically or when a status change occurs, or subsequently to requests, or calls to remote procedures at an offering device, made by a requesting device.

The SOME/IP protocol is based on the serialization of data in protocol data units (PDUs), as a payload of UDP or TCP messages, transported over a communications network based on an Internet protocol (IP).

Currently, the SOME/IP protocol is characterized by the lack of security in the exchange of information inside the vehicle, so it may happen that external devices may obtain access to the on-board transmission means and from there they may intercept messages, accessing information exchanged between two entities, or sending false messages towards a recipient entity, assuming the role of a transmitting entity without the recipient entity being aware of a falsified transmission.

The document "Specification of manifest AUTOSAR AP Release 17-10" of 17 Oct. 2017 and the article by J. Kreissl entitled "Absicherung der SOME/IP Kommunikation bei Adaptive AUTOSAR" of 15 Nov. 2017 propose the use of the TLS protocol to encapsulate SOME/IP messages. However, the TLS protocol is only intended to protect unicast transmissions and is specific to the transmission protocol.

In a communication authentication indicates the process of verifying the identity of a subject/entity. Authorization refers instead to the rules that determine what a subject/entity is allowed to do. The two concepts are orthogonal and independent, but both are important in the design of systems that operate safely. In the prior art, user authentication is usually a requirement for authorizing a specific entity to perform a predetermined operation.

In the TLS protocol, the authentication of the entities communicating with each other is implemented through digital certificates. During an initial step of establishing a session, the server and the client are required to present their digital certificate to each other together with proof that they are the legitimate holders of the certificate. For this purpose, digital certificates are used to associate an identity with some cryptographic parameters, for example a public key, which may be verified. However, the TLS protocol has no means to attribute any meaning to the content of digital certificates. Therefore, although it allows the entities in communication with each other to be authenticated, the TLS protocol is not itself able to verify whether an entity is also authorized to initiate a communication. In fact, this verification is left to higher level protocols and applications.

The aforementioned documents propose the use of the TLS protocol to establish secure communication paths between different devices, suggesting the use of server and client side certificates to obtain mutual authentication. No further verification is performed other than verification of the validity of digital certificates. These documents do not provide further details on how to verify whether a communication between two entities should be allowed or not, i.e. to prevent an application from accessing a service to which it is not authorized.

The TLS protocol itself has some drawbacks. Multiple levels of security are not officially supported by the latest version of the standard (TLS 1.3), so it is in fact limited to the more expensive "confidentiality" security level. Even assuming application of the version of the TLS 1.2 standard—which supports a set of encryption suites operating in authentication only mode—the security level would depend on some modifiable local parameters (the set of encryption suites allowed) for which there would not be a guarantee to actually respect the level of security that designers and developers would want.

However, unlike traditional Internet servers, automotive ECUs are physically accessible on a vehicle, making it easy to edit the contents of unprotected configuration files.

SUMMARY OF THE INVENTION

The object of the present invention is to provide an extension of the SOME/IP protocol which allows the secure exchange of information within a vehicular communications network.

According to the present invention, this object is achieved by a method for transmitting data or messages on an on-board communications network of a vehicle as described and claimed herein.

Particular embodiments are also described and claimed herein.

In summary, the present invention is based on the principle of certifying which entities requesting an instance of a given service and which entities offering an instance of a given service are authorized to communicate with each other on board the vehicle (traffic matrix), whereby each service, or each application whose execution carries out a service, may only be accessed by authorized entities. An entity is an on-board device or an application executed by an on-board device. The authorization of an entity on board a vehicle to request or provide a service, be it an on-board device or a specific application with which a device performs a predetermined function among a plurality of executable functions, is certified by a certification body external to the vehicle, such as the vehicle manufacturer or the first-tier supplier of an on-board component.

The authorization of an entity of a vehicle to request or provide a service instance is mutually verified both by the entity requesting the service instance and by the entity offering the service instance, and an authentication code is associated with any subsequent communication message between the entities involved defined according to the SOME/IP protocol that is transmitted between the offering entity and the requesting entity, if the verification of the authorizations of both entities has given a positive result.

The authentication code is generated by the sending entity by means of a cryptographic function which receives in input the message to be protected and a symmetric encryption key associated with the service instance and returns a fixed-size string of bytes in output. The symmetric key associated with the relevant service instance, exchanged between the authorized entities before starting communication during a step of establishing the communication session, is used. It allows the receiving entity, in possession of the same symmetric key, to verify that the message has not been modified since its creation (integrity) and that it has been generated by an entity that knows the symmetric key (authentication).

Therefore, the solution of the invention uses to its advantage the integration in the SOME/IP middleware to obtain both the authentication functions of the entities in communication and authorization to start the communication during the establishment of each secure communication session. Unlike the prior art, a different secure session must be established for each different SOME/IP service instance, i.e. the solution of the invention operates at a granularity of service instance.

Each application (or on-board device) is associated with a different digital certificate for authentication purposes. Furthermore, the same digital certificates are enhanced to declare the set of services that an application (or on-board device) is authorized to offer/request. In this way, digital certificates may be used to the benefit of motor vehicle manufacturers to define an allowed traffic matrix, declaring the whole set of communications that may actually be established.

Whenever a new communication is initiated by an application that wishes to access a service, an exchange of certificates takes place, similarly to the TLS protocol. Similarly to the TLS protocol, the validity of the digital certificate presented by the entity requesting the communication is initially verified. Unlike the TLS protocol, the invention also provides for verification of whether the entity is also authorized to initiate communication, verifying the correspondence between the current service instance and the rules declared in its certificate. In other words, both authentication and authorization to access a service instance are verified according to the method of the invention during the establishment of a secure session, before the exchange of application data.

Advantageously, by virtue of the invention it is possible to provide at least two levels of security to communications between different on-board entities of a vehicle according to the needs, respectively a first security level of "authentication", in which it is ensured that a message has reached a receiving entity originated from a certified (authorized) entity and was not modified during the transit over the network, and a second, greater, security level of "confidentiality", in which unauthorized third parties are prevented from decoding the content of a message in transit over the network.

Specifically, the "authentication" security level ensures that only authorized entities may send messages associated with a specific service, providing message authentication. Before a packet according to the SOME/IP protocol containing a message relating to a service instance is sent by a transmitting entity, whether it is an offering entity or a requesting entity, an authentication code (MAC) is attached to it, generated through symmetric encryption mechanisms. When the receiving entity receives the message, this code may be verified: in case the validation is successful, the receiving entity may determine that the message originated from a reliable and certified (authorized) transmitting entity and has not been modified in the transit over the network. In other words, the receiving entity may be sure of the authenticity and integrity of the message. Furthermore, by adding a sequence number whose reliability is guaranteed by the aforementioned authentication code in a Support Data field, it is possible to prevent attacks by replication, which are characterized by the interception of valid information packets and subsequent retransmission by third parties of the same packet for a new request of the same action. In the case of an "authentication" security level, although a third entity is able to intercept the information transmitted on the vehicular communications network, it is unable to inject false messages, which may be easily detected since they lack the message authentication code generated using the cryptographic key exchanged following the mutual recognition of the offering and receiving entities, and consequently ignored by the receiving entity. This mode balances the importance of preventing third parties from triggering physical actions, that may even be dangerous, on board a vehicle by means of false commands, with the possibility that the data exchanged are not confidential, in order to safeguard computational and transmission resources.

The "confidentiality" security level includes all the properties offered by the previous "authentication" security level, that is, it guarantees the authenticity and integrity of the messages exchanged on the vehicular communications network, and prevents attacks by replication. In addition, before the transmission of each message takes place, the payload of the message is encrypted with an encryption function to prevent unauthorized entities from accessing it. This also ensures confidentiality, i.e. the secrecy of the data. A third party attempting an intrusion on the vehicle's communications network is therefore unable to inject messages into the network, because they would be recognized through the verification of the authentication code, nor is it able to decode the transmitted data, not having the necessary key for deciphering the semantic meaning of messages. This mode provides the highest level of security, at the cost of a higher computational burden, especially in terms of latency of message transmission.

The Support Data field may advantageously include, in addition to the sequence number, any other parameters required by the symmetric cryptographic algorithm chosen, for example the initialization vector, which may coincide with the sequence number.

BRIEF DESCRIPTION OF THE FIGURES

Further features and advantages of the invention will appear more clearly from the following detailed description of an embodiment thereof, given by way of non-limiting example with reference to the accompanying drawing, in which.

DETAILED DESCRIPTION

Figure 1:
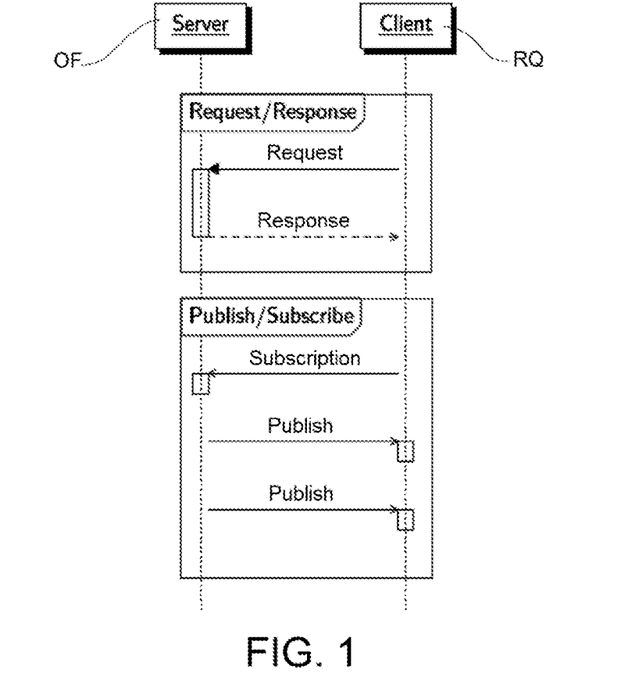
FIG. 1 shows the known communication modes between an entity requesting a service, or client, and an entity offering the service, or server, in a vehicular communications network.

FIG. 1 shows two different types of communication between a server entity, or offering entity OF, and a client entity, or requesting entity RQ. A first type of communication, called "Request/Response," includes the sending of a request to a service instance by the requesting entity RQ and optionally, as a consequence of it, the sending of a response by the offering entity OF. A second type of communication, called "Publish/Subscribe," includes the activation of a subscription to one or more events associated with a service instance by the requesting entity RQ and the sending of periodic or event-triggered notifications by the offering entity OF.

Figure 2:
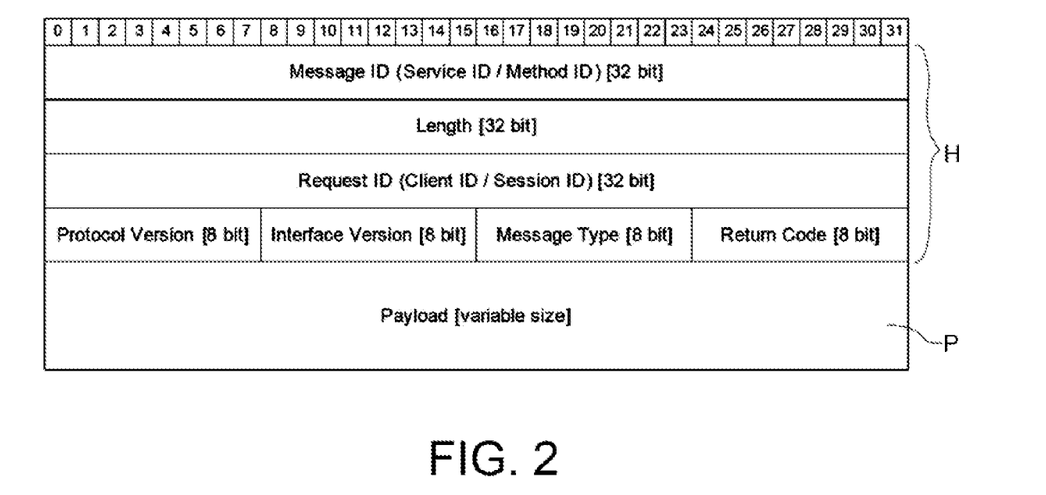
FIG. 2 schematically shows the known format of a message transmitted over a vehicular communications network according to the SOME/IP protocol, including a header and a payload.

FIG. 2 shows the format of a message transmitted over a vehicular communications network according to the SOME/IP protocol. The message includes a header H comprising a message identifier, a message length, a request identifier and a plurality of identification fields of the protocol version, the interface version, the type of message and the return code. The message also includes a variable size payload P.

Figure 3:
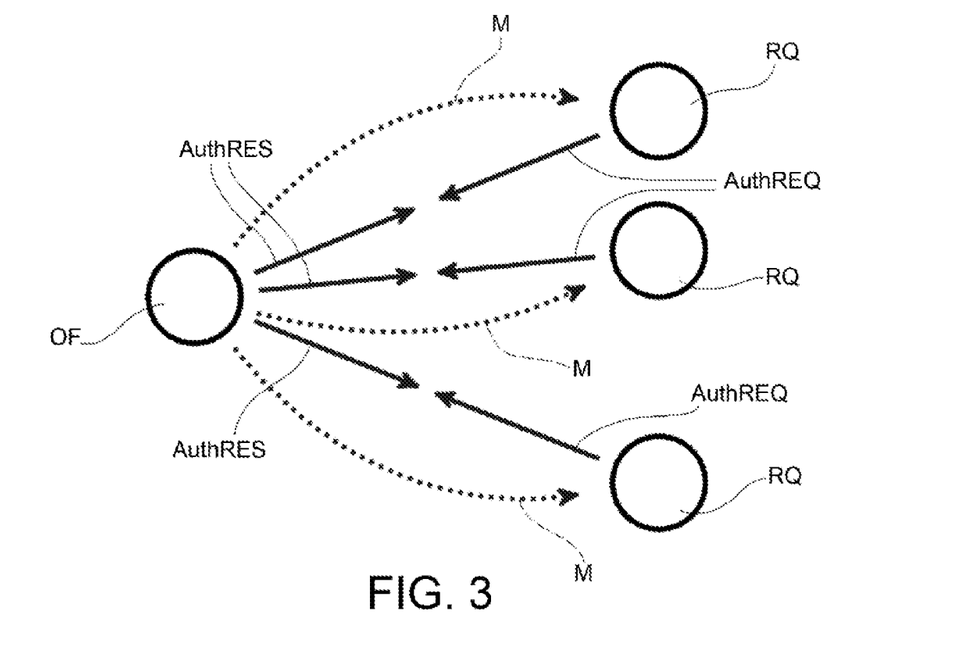
FIG. 3 is a schematic representation of a multicast communication configuration over a vehicular communications network to which the invention relates.

FIG. 3 shows a schematic representation of a multicast communication configuration on a vehicular communications network, in which a plurality of entities RQ requesting the same service instance communicate with a single entity OF offering the service instance. The continuous line arrows AuthREQ and AuthRES represent a two-way communication of mutual authentication while the dashed arrows M represent a message communication session according to the secure SOME/IP protocol of the invention, possible only if mutual authentication is successful.

Figure 4:
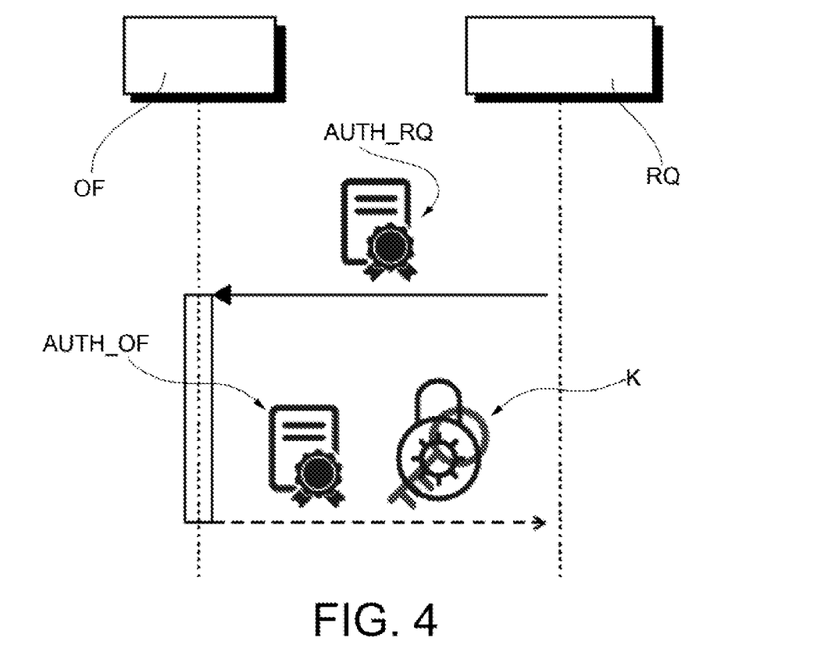
FIG. 4 is a high level schematic representation of the establishment of a communication session between a requesting entity and an offering entity connected to the vehicular communications network, according to the invention.

FIG. 4 shows a schematic representation of the establishment of a communication session between a requesting entity RQ and an offering entity OF facing the vehicular communications network, characterized by mutual authentication by means of an asymmetric encryption technique. The requesting entity RQ transmits an AUTH_RQ authentication and authorization certificate at the time of the request to a service instance of an offering entity OF, and the latter responds with the transmission of an AUTH_OF authentication and authorization certificate together with a symmetric cryptography key K in encrypted form.

Figure 5:
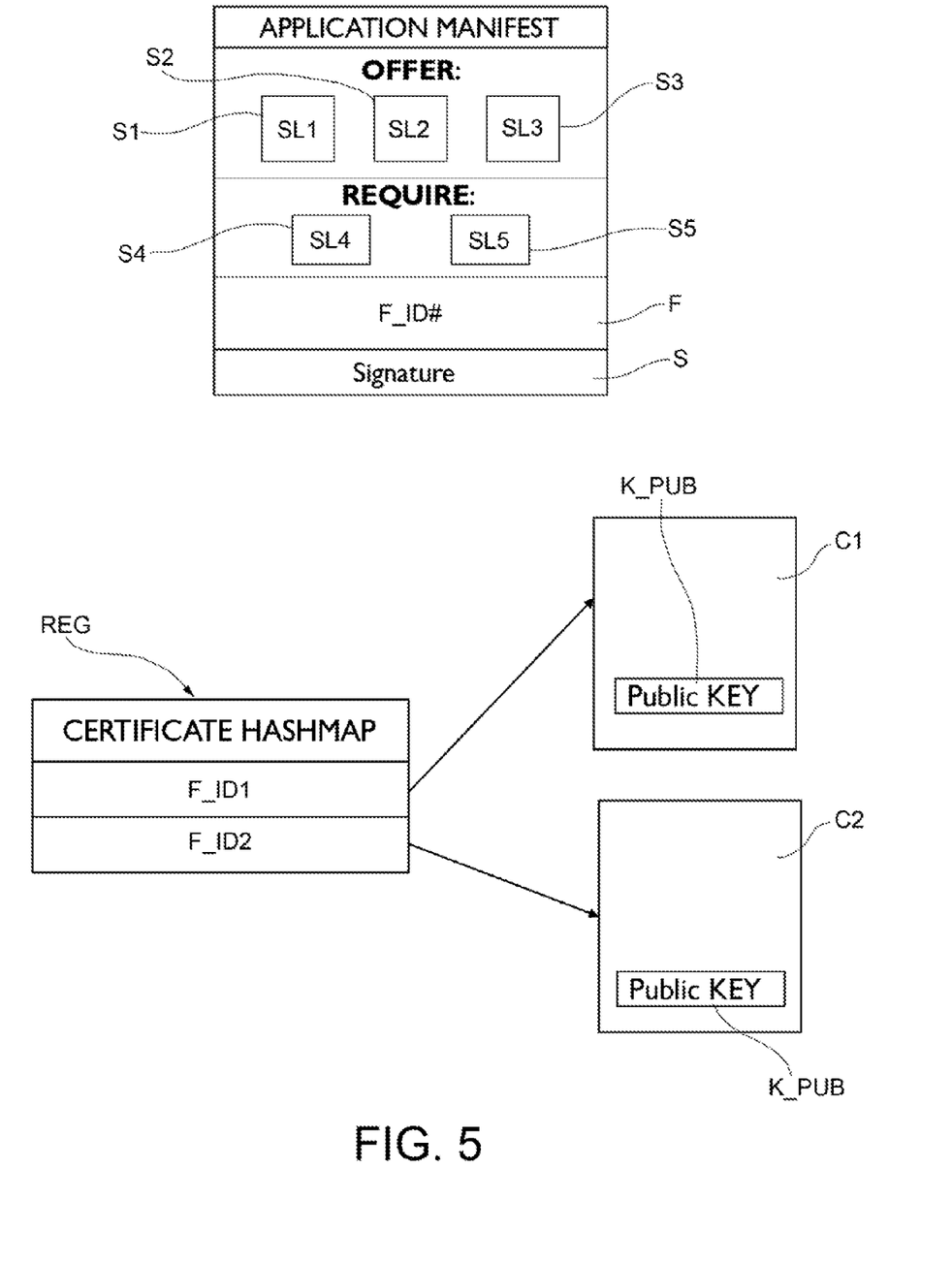
FIG. 5 is a schematic representation of a declaration of the properties of a vehicle entity, or of an application executed by a vehicle entity, connected to a vehicular communications network according to the invention.

FIG. 5 shows a schematic representation of a declaration of the properties of a vehicle entity E, or of an application executed by a vehicle entity E, connected to a vehicular communications network. An entity E or an application executed by an entity E may offer a plurality of services S1, S2, S3, each with a respective minimum security level SL1, SL2, SL3 and may request a plurality of services S4, S5 each with a respective minimum security level SL4, SL5. Such an entity or application is associated with a certification fingerprint F and a signature S. The certification fingerprint may be a certificate C, for example according to the X.509 standard, or a certificate identifier F_ID #, where #=1, 2, . . . adapted to point to a centralized certificate register REG of the vehicle or replicated in each on-board device (in the latter case obtaining higher efficiency since the certificates are available locally when they are requested), for example published by a certification body external to the vehicle such as the vehicle manufacturer or the first tier supplier of an on-board component, the respective certificate C# (where #=1, 2, . . . ) including a public cryptography key K_PUB adapted to operate with a corresponding private cryptography key K_PRIV, accessible only to the corresponding entity, for the encryption and decryption of data exchanged between the requesting and offering entities RQ, OF according to a known asymmetric encryption technology. The certification (i.e. the existence and validity of the certificate) certifies the authorization of the entity requesting the service instance and of the entity offering the service instance to communicate with each other on board the vehicle. A service, or an application whose execution creates a service, may only be accessed by authorized entities.

With reference to FIGS. 6 to 9, a secure communication method according to the SOME/IP protocol according to the invention is described below.

Figure 6:
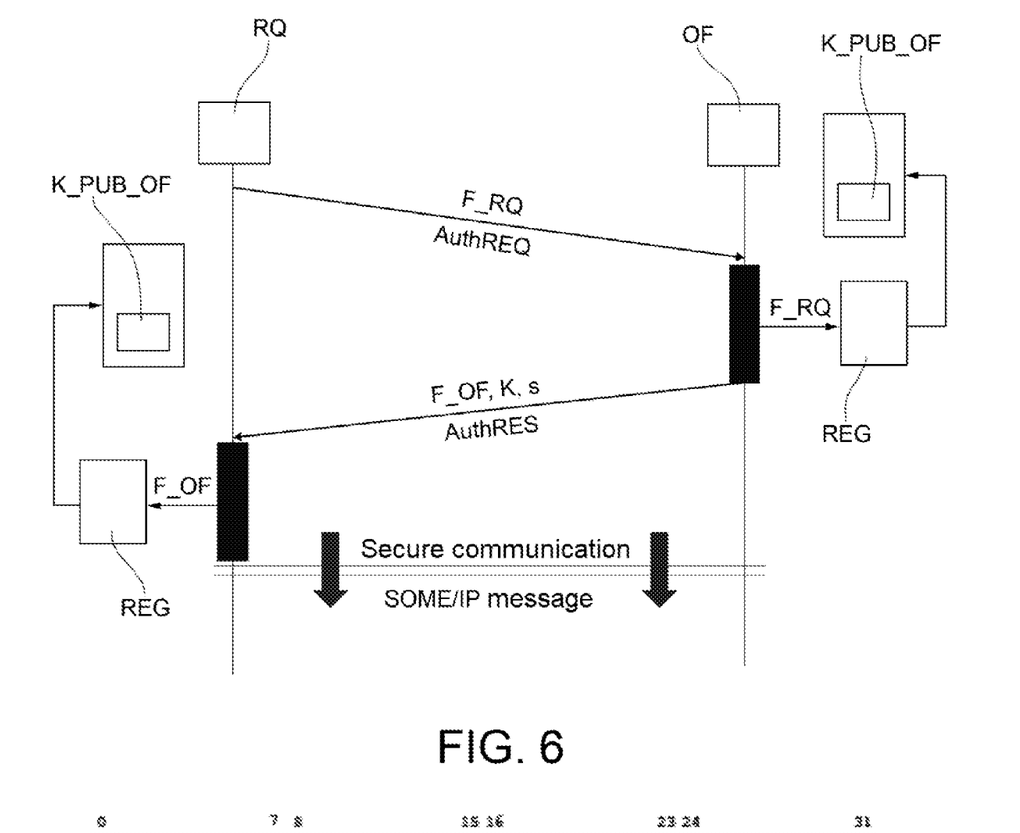
FIG. 6 shows a sequence diagram representative of a mutual authentication scenario between an entity requesting a service instance and an entity offering a service instance, according to the method of the invention.
Figure 7:
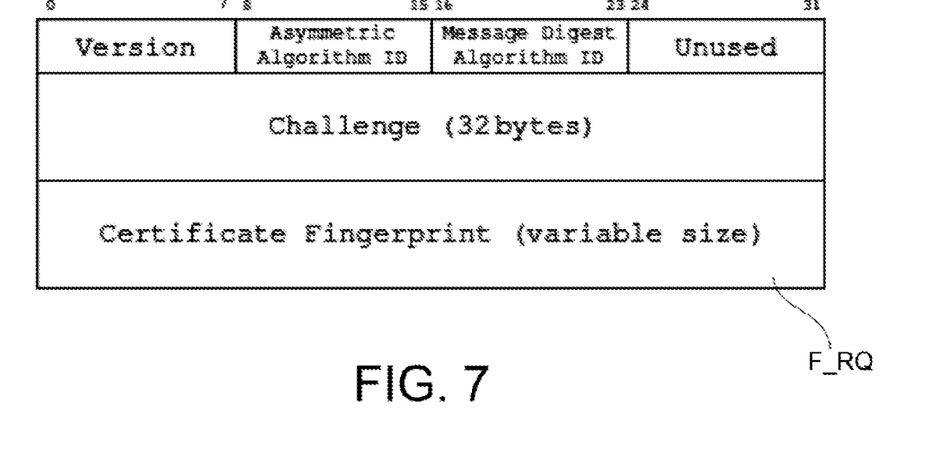
FIG. 7 schematically shows an example of the format of an authentication request message according to the method of the invention.

FIG. 6 shows a sequence diagram of a mutual authentication scenario between a requesting entity RQ and an offering entity OF. In a first step, the requesting entity RQ sends on the vehicular communications network an AuthREQ authentication request message to an offering entity OF to which it intends to make a request of a service instance. A possible format of the AuthREQ authentication request message is shown in FIG. 7. It includes, in particular, an F_RQ certification fingerprint of the requesting entity RQ.

Upon receiving the AuthREQ authentication request message, the offering entity OF retrieves the certificate of the receiving entity through the F_RQ fingerprint, for example by accessing the certificate through the REG certificate register, consulted at the address associated with the certificate identifier F_RQ. The offering entity validates the certificate by verifying the digital signature contained therein, by using the public key contained in a master certificate, called the "root certificate," the integrity and authenticity of which is guaranteed through external mechanisms, and in case of success compares the minimum security level $SL_{RQ}$ allowed by the requesting entity expressed by the certificate with the security level $SL_{SE}$ to which the service instance is currently offered. In the event that the minimum security level $SL_{RQ}$ allowed by the requesting entity is higher than the security level to which the service instance is offered, $SL_{RQ} > SL_{SE}$, the offering entity OF aborts the communication. Otherwise, if the minimum security level $SL_{RQ}$ allowed by the requesting entity is equal to or lower than the security level $SL_{SE}$ to which the service instance is offered, the offering entity OF responds by sending on the vehicular communications network an AuthRES authentication response message.

Figure 8:
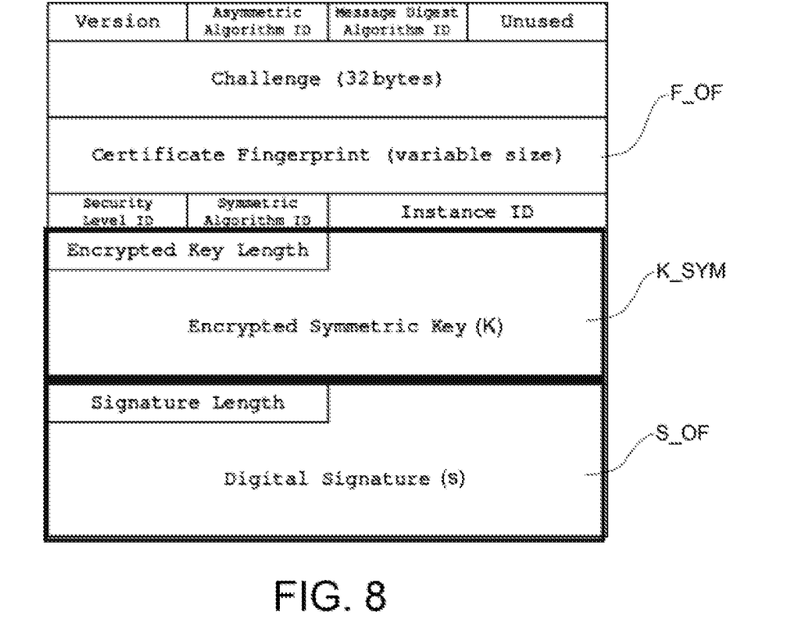
FIG. 8 schematically shows an example of the format of an authentication reply message according to the method of the invention.

A possible format of the AuthRES authentication response message is shown in FIG. 8. It includes, in particular, a certification fingerprint F_OF of the offering entity OF, a symmetric encryption key K_SYM encrypted by means of the public encryption key K_PUB_RQ of the requesting entity RQ acquired from the certificate of the requesting entity, indicated with k where k=encrypt $(K\_SYM)_{K\_PUB\_RQ}$, and a digital signature S_OF affixed by means of the private cryptographic key of the offering entity OF, indicated with s where s=sign$(AuthRES)_{K\_PRIV\_OF}$.

Upon receiving the AuthRES authentication response message, the requesting entity RQ retrieves the certificate of the offering entity through the F_OF fingerprint, for example by accessing the certificate through the REG certificate register, consulted at the address associated with the certificate identifier F_OF. The requesting entity validates the certificate by verifying the digital signature contained therein, by using the public key contained in a master certificate, called the "root certificate," the integrity and authenticity of which is guaranteed through external mechanisms, and in case of success verifies the signature s associated with the message received by means of the public encryption key K_PUB_OF of the offering entity OF acquired from the certificate of the offering entity. If the validation of the digital signature is successful, the requesting entity compares the security level $SL_{SE}$ to which the service instance is currently offered both with the minimum security level $SL_{OF}$ that must be guaranteed by the offering entity expressed by the certificate and with its own minimum security level allowed $SL_{RQ}$. In the event that the security level to which the service instance is offered is lower than the minimum security level $SL_{OF}$ that must be guaranteed by the offering entity, $SL_{SE} < SL_{OF}$, or the security level to which the service is offered is below its minimum allowed security level $SL_{RQ}$, $SL_{SE} < SL_{RQ}$, the requesting entity aborts the communication. In the opposite case in which the security level to which the service instance is offered is equal to or higher than both the minimum security level $SL_{OF}$ that must be guaranteed by the offering entity and its own minimum security level allowed $SL_{RQ}$, the requesting entity RQ completes the establishment of the communication session by decrypting, by means of the private cryptographic key of the receiving entity RQ, the symmetric key transmitted by the offering entity for the subsequent protection of the messages, briefly indicated with the expression K_SYM=decrypt$(k)_{K\_PRIV\_RQ}$.

The authorization of an entity of a vehicle to request or provide a service instance is then mutually verified both by the entity requesting the service instance and by the entity offering the service instance, through the verification of the relevant certificate, and an authentication code is associated with any subsequent communication message between the entities involved according to the SOME/IP protocol that is transmitted between the offering entity and the requesting entity, if the verification of the authorizations of both entities has given a positive result.

Figure 9:
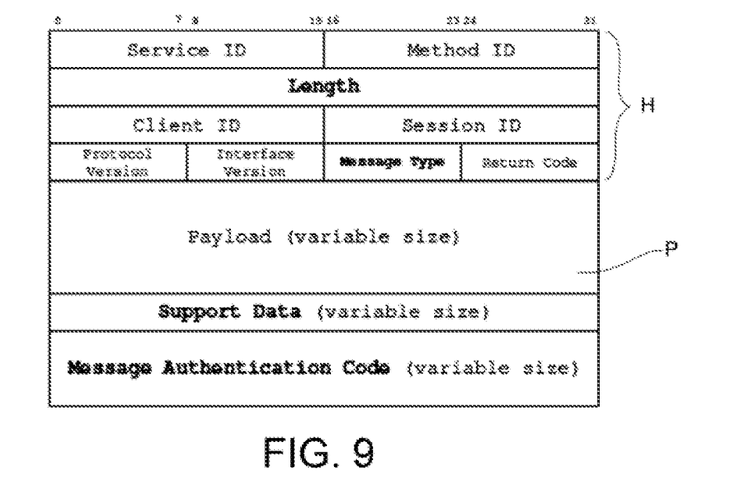
FIG. 9 schematically shows an example of the format of a message transmitted over the vehicle network according to the improved SOME/IP protocol according to the invention.

Once the communication session between the requesting entity RQ and the offering entity OF has been established, messages may be exchanged securely according to the SOME/IP communication protocol between the two authenticated and authorized entities, according to the format shown in FIG. 9, in which the payload P is encrypted by means of the symmetric key K_SYM if a "confidential" communication is in progress.

Advantageously, the described method guarantees the protection of a message with a different symmetric key for each service instance in a multicast communication configuration. The key is generated by the offering entity and shared securely with a multiplicity of requesting entities during a step of establishing a communication session. A re-generation of the key may be convenient for long-lasting services, for example for the communication of position data, and should be carried out with a periodicity such as to preserve over time the level of security guaranteed by the features of the cryptographic algorithm and the key used.

The use of a single key in a specific group of entities whose communication concerns a predetermined service instance allows multicast communications to be transparently protected without limiting the functionality of the SOME/IP protocol and without increasing the use of the vehicular communications network.

Advantageously, the method of the invention is designed to operate preferably with granularity at the level of service instances, i.e. considering each instance of a SOME/IP service as a unique object to which a predetermined application (or on-board device) may have access or be denied access. This condition is an efficient compromise between the need for a strong isolation of communications, which requires the adoption of extremely fine granularity, and attention to resources, which requires a limitation of the number of processes for establishing authentication sessions in order not to cause an unsustainable increase in latency in the transmission of messages and data over the vehicular communications network.

Unlike the TLS protocol, the method of the invention is designed to rigorously respect the level of security configured by the designers of an application or on-board device, by the provision that digital certificates declare the minimum level of security that must be respected by each entity in addition to defining the set of service instances that each on-board application or device is authorized to access (traffic matrix). Hence, during a step of establishing a communication session, the level at which a desired service instance is provided is compared with the requirements of the offering entity and the requesting entity to prevent these entities from violating previously imposed design constraints. Assuming guaranteed the authenticity and integrity of the digital certificates, the method of the invention prevents attacks based on the forced degradation of the security level below the requirements imposed by the designers of an application or on-board device.

The invention therefore represents a personalized approach integrated into the SOME/IP protocol to relax the constraints imposed by external solutions and obtain compatibility with all the different communication models supported by the SOME/IP protocol (unicast and multicast). It achieves the aim of providing a simple and effective solution for expressing the traffic matrix allowed in a vehicle (the set of services that each entity may request/offer) and at the same time providing multiple levels of security to take into account the different security and overhead requests that may arise.

Of course, the principle of the invention being understood, the manufacturing details and the embodiments may widely vary compared to what described and illustrated by way of a non-limiting example only, without departing from the scope of the invention as defined in the appended claims.

The invention claimed is:

1. A method for transmitting data or messages on a communications network on board a vehicle between a requesting entity requesting a service instance and an offering entity offering a service instance using a Service Oriented Middleware over Internet Protocol (SOME/IP) communication protocol, in which said offering entity provides a response as a result of a request by said requesting entity, or in which said offering entity provides periodic notifications or notifications triggered by events as a result of a subscription to a service by said requesting entity, wherein an authorization to said requesting entity and to said offering entity to access the service instance is predefined by a certification body external to the vehicle, which issues a pre-assigned certificate of said requesting entity and said offering entity, wherein the pre-assigned certificate of said offering entity further assigns a minimum security level to said service for the offering entity among a plurality of predetermined security levels and the pre-assigned certificate of said requesting entity assigns a minimum security level to said service for the requesting entity among said plurality of predetermined security levels, wherein said plurality of predetermined security levels comprises an authentication security level, in which a message authentication code encrypted with a predetermined encryption function is associated with each communication message of the service instance, and a confidentiality security level, in which each communication message includes a message authentication code encrypted with a predetermined encryption function and payload encrypted with said predetermined encryption function, and wherein said method comprises a preliminary mutual authentication step between said requesting entity and said offering entity in view of a subsequent communication associated with the service instance, comprising:

verifying existence and mutual validity of said pre-assigned certificate of said requesting entity and of said offering entity, verifying that security level of the service offered by the offering entity is not less than the minimum security level pre-assigned to said service at the requesting entity and at the offering entity, and transmitting at least one communication message associated with the service instance from the offering entity to the requesting entity and vice versa based on successful security level verification and successful pre-assigned certificate verification.

2. The method of claim 1, wherein said predetermined encryption function includes a symmetric encryption key associated with a respective service instance communicated by said offering entity to said requesting entity in the preliminary mutual authentication step.

3. The method of claim 2, wherein said message authentication code is generated by a sending entity by use of said predetermined encryption function which receives in input said communication message and said symmetric encryption key associated with the service instance and returns a fixed-size string of bytes.

4. The method of claim 2, wherein said symmetric encryption key is communicated by said offering entity to said requesting entity encrypted by a public encryption key of the requesting entity.

5. The method of claim 1, wherein verifying that the security level of the service offered by the offering entity is not less than the minimum security level pre-assigned to said service at the offering entity and at the requesting entity is implemented at the offering entity and at the requesting entity.

6. The method of claim 1, wherein said preliminary mutual authentication step comprises sending from the requesting entity to the offering entity an authentication request message including said pre-assigned certificate or an identifier of said pre-assigned certificate of the requesting entity and sending from the offering entity to the requesting entity an authentication response message including said pre-assigned certificate or an identifier of said pre-assigned certificate of the offering entity.

7. The method of claim 6, wherein said pre-assigned certificate of the requesting entity and said pre-assigned certificate of the offering entity are stored in a centralized certificate register of the vehicle or replicated in each on-board device, published by the certification body external to the vehicle.

8. The method of claim 6, wherein verifying the existence and mutual validity of said pre-assigned certificate of said requesting entity and of said offering entity is carried out by verifying correctness of a digital signature associated with said pre-assigned certificate, using a public key contained in a master certificate, whose integrity and authenticity is guaranteed by external mechanisms.

9. The method of claim 6, wherein said authentication response message further includes a control signature of the offering entity generated by a private cryptographic key of the offering entity.

10. The method of claim 2, wherein a plurality of requesting entities requesting a same service instance communicates with a single offering entity offering the service instance in a multicast communication configuration, in which said symmetric encryption key associated with said service instance is generated by said single offering entity and shared with said plurality of requesting entities.

* * * * *